United States Patent
Margolf

(10) Patent No.: US 12,202,043 B2
(45) Date of Patent: Jan. 21, 2025

(54) METHODS AND DEVICES FOR PRODUCING THREE-DIMENSIONAL COMPONENTS BY SELECTIVE SOLIDIFICATION

(71) Applicant: TRUMPF Laser-und Systemtechnik GmbH, Ditzingen (DE)

(72) Inventor: Andreas Margolf, Korntal-Muenchingen (DE)

(73) Assignee: TRUMPF Laser-und Systemtechnik GmbH, Ditzingen (DE)

( * ) Notice: Subject to any disclaimer, the term of this patent is extended or adjusted under 35 U.S.C. 154(b) by 696 days.

(21) Appl. No.: 17/405,628

(22) Filed: Aug. 18, 2021

(65) Prior Publication Data

US 2021/0379662 A1 Dec. 9, 2021

Related U.S. Application Data

(63) Continuation of application No. PCT/EP2020/054687, filed on Feb. 21, 2020.

(30) Foreign Application Priority Data

Feb. 26, 2019 (DE) .......................... 102019104781.1

(51) Int. Cl.
*B22F 10/28* (2021.01)
*B22F 12/00* (2021.01)
(Continued)

(52) U.S. Cl.
CPC .............. *B22F 12/41* (2021.01); *B22F 10/28* (2021.01); *B22F 12/224* (2021.01); *B22F 12/30* (2021.01);
(Continued)

(58) Field of Classification Search
None
See application file for complete search history.

(56) References Cited

U.S. PATENT DOCUMENTS 10,717,262 B2 7/2020 Hochsmann et al.
2016/0311027 A1* 10/2016 Shimoyama .......... B29C 64/188
(Continued)

FOREIGN PATENT DOCUMENTS

DE 102011075748 11/2012
DE 102014112446 3/2016
(Continued)

OTHER PUBLICATIONS

Machine Translation of DE-102011075748-B4 (Year: 2011).*
(Continued)

*Primary Examiner* — Anthony M Liang
(74) *Attorney, Agent, or Firm* — Fish & Richardson P.C.

(57) ABSTRACT

The disclosure relates to methods and devices for producing three-dimensional components by selective solidification from build material applied in layered fashion by providing a building cylinder in which substrate plates are stacked one above the other, applying the build material to the uppermost substrate plate with an application device, generating at least one beam and directing the beam onto the applied layer of the build material, moving the application device along a working plane at least along the building cylinder and at least one collecting chamber for non-solidified build material, and moving the substrate plate out in relation to the building cylinder such that a bottom of the substrate plate lies in the working plane, wherein the substrate plate which has been moved out of the building cylinder is transferred by the application device from the building cylinder into the adjacent collecting chamber.

14 Claims, 4 Drawing Sheets

(51) Int. Cl.
    *B22F 12/30*     (2021.01)
    *B22F 12/33*     (2021.01)
    *B22F 12/41*     (2021.01)
    *B22F 12/88*     (2021.01)
    *B28B 1/00*     (2006.01)
    *B33Y 10/00*     (2015.01)
    *B22F 10/32*     (2021.01)

(52) U.S. Cl.
    CPC .............. *B22F 12/38* (2021.01); *B22F 12/88* (2021.01); *B28B 1/001* (2013.01); *B33Y 10/00* (2014.12); *B22F 10/32* (2021.01); *B22F 12/33* (2021.01)

(56) References Cited

U.S. PATENT DOCUMENTS

| | | | |
|---|---|---|---|
| 2017/0246808 A1* | 8/2017 | Höchsmann | B33Y 30/00 |
| 2018/0222117 A1 | 8/2018 | Herzog | |
| 2018/0236504 A1* | 8/2018 | Pourcher | B08B 5/04 |
| 2020/0198235 A1 | 6/2020 | Maier | |

FOREIGN PATENT DOCUMENTS

| | | | | |
|---|---|---|---|---|
| DE | 102017213078 | | 1/2019 | |
| DE | 102007048385 | | 8/2020 | |
| DE | 102011075748 | B4 * | 4/2024 | .............. B22F 10/73 |
| EP | 2289652 | | 3/2011 | |
| EP | 2507037 | | 10/2012 | |
| EP | 2286982 | B1 * | 9/2013 | ............ B22F 3/1055 |
| KR | 101687003 | B1 * | 12/2016 | .............. B33Y 80/00 |

OTHER PUBLICATIONS

Machine Translation of KR101687003B1 (Year: 2016).*
Machine Translation of EP-2286982-B1 (Year: 2013).*
DE Office Action in German Appln. No. DE 102019104781.1, dated Oct. 25, 2019, 10 pages (with English translation).
PCT International Preliminary Report on Patentability in International Appln. No. PCT/EP2020/054687, dated Aug. 25, 2021, 14 pages (with English translation).
PCT International Search Report and Written Opinion in International Appln. No. PCT/EP2020/054687, dated Apr. 22, 2020, 18 pages (with English translation).

* cited by examiner

METHODS AND DEVICES FOR PRODUCING THREE-DIMENSIONAL COMPONENTS BY SELECTIVE SOLIDIFICATION

CROSS REFERENCE TO RELATED APPLICATIONS

This application is a continuation of and claims priority under 35 U.S.C. § 120 from PCT Application No. PCT/EP2020/054687, filed on Feb. 21, 2020, which claims priority from German Application No. 10 2019 104 781.1, filed on Feb. 26, 2019. The entire contents of each of these priority applications are incorporated herein by reference.

TECHNICAL FIELD

The current disclosure relates to methods and devices for producing three-dimensional components by selective solidification from build material applied in layered fashion.

BACKGROUND

DE 10 2011 075 748 A1 has disclosed devices for producing three-dimensional components. The devices comprise a process chamber within which a building cylinder is provided so as to be assigned to the working plane of the process chamber. Multiple substrate plates may be received in movable fashion in the building cylinder. The devices furthermore comprise an application device which is movable along the working plane and which applies build material for selective solidification by means of a beam to the substrate plate in the building cylinder. In addition to the application device, a powder suction-extraction device with a suction-extraction hood is provided to extract non-solidified build material by suction after the completion of the three-dimensional component. Following this, the uppermost substrate plate is moved to the working plane such that a bottom side of the uppermost substrate plate lies flush with the working plane. The uppermost substrate plate with the completed component is, with the powder suction-extraction device, pushed into an interim storage area or alternatively into a lock that is adjacent to the process chamber.

SUMMARY

The disclosure provides inexpensive methods and inexpensive devices for producing three-dimensional components with high capacity utilization. In an embodiment, the disclosure provides methods for producing three-dimensional components by selective solidification from build material applied in layered fashion, in which an uppermost substrate plate, which is situated in the building cylinder and which has at least one finished component situated thereon, is transferred by an application device from the building cylinder into an adjacent collecting chamber or into a magazine. The application device introduces non-solidified build material into the building cylinder for the applied layer of the build material to subsequently be solidified by at least one beam from a beam source. The application device is at the same time also used for transferring the uppermost substrate plate (e.g., of multiple substrate plates arranged in the building cylinder) into the adjacent collecting chamber or into the magazine. It is thereafter possible, without any downtime of the device, for further three-dimensional components to be produced on the further substrate plate situated in the building cylinder. is the new methods make it possible for multiple substrate plates to be used in succession for producing three-dimensional components, wherein short cycle times are made possible through the use of the application device for transporting away substrate plates with finished components.

The disclosure can further provide that the movement of the application device is driven with a force that is higher than a holding force of a releasable holding device between two adjacent substrate plates. The substrate plates, which are adjacent to one another or stacked one above the other, are pre-fixed relative to one another by means of the releasable holding device, such that a relative rotation and a displacement movement with a low force relative to one another is prevented. The movement of the application device is controlled with such a force that, for the displacement of the uppermost substrate plate into the collecting chamber or into the magazine, after the engagement of the application device on the uppermost substrate plate, the holding device is released from the substrate plate situated underneath. On the application device, there is provided at least one guide element by means of which the substrate plate is guided during a movement from the building cylinder into the collecting chamber or into the magazine.

The process reliability can be increased by means of the at least one guide element, which helps ensure a defined transfer of the substrate plate into the collecting chamber or a magazine. The disclosure further provides that, before the transfer of the substrate plate with the at least one completed three-dimensional component into a magazine, traverse elements are positioned in the collecting chamber. These traverse elements make it possible to maintain an existing structural design of the process chamber, and to reliably traverse the collecting chamber for the transfer of the substrate plate into the magazine situated outside the collecting chamber.

The disclosure further provides devices for producing three-dimensional components by selective solidification from build material applied in layered fashion, in which devices an application device can be controlled so as to realize substrate plate transport, by which the uppermost substrate plate guided out of the building cylinder is displaceable in the collecting chamber or in a magazine.

During the substrate plate transport from the building cylinder into the collecting chamber or the magazine, the dispensing of build material is stopped. The movement of the application device along the working plane serves for the removal of the uppermost substrate plate with components produced thereon, such that the subsequent substrate plate is provided in the building cylinder for the production of three-dimensional components by selective solidification from build material applied in layered fashion in the building cylinder. In this way, it is possible to achieve a reduction in parts costs for the construction of the device, and furthermore, the device can be operated without a machine operator and without an intermediate stoppage before the next production step.

One embodiment of the methods provides that at least one support element is additionally built on the substrate plate on which the component or components are built, which at least one support element has the height of the tallest component or is built so as to be taller, such that the substrate plates transferred into the collecting chamber can be stacked so as to lie one above the other by means of the support elements. This allows for protection of components against damage by the falling movement of a substrate plate transferred into the collection chamber onto the substrate plate most recently introduced into the collection chamber (i.e., because the substrate plate falls on the support elements of the previous substrate plate, slowing or preventing an impact on its components).

It is advantageously the case that, on the application device, there is provided at least one guide element by means of which the substrate plate is guided during a movement along a working plane. The guide element is provided on a side wall of the application device which is situated at the front during a movement of the application device and which engages on the substrate plate. The additional attachment of the at least one guide element is an inexpensive measure in relation to the arrangement of a separate substrate plate transport device.

The guide element arranged on the application device is composed of two mutually spaced-apart projections, or of a stop with a concave depression. The guide element is designed such that the substrate plate is, during the movement of the application device, moved along the movement axis thereof.

The at least one guide element can be produced from an elastic material, e.g., from plastic. In this way, the guide element can provide damping upon the engagement of the guide element on the substrate plate.

At least one releasable holding device is provided between two adjacent substrate plates that are stored in the building cylinder. The releasable holding device makes it possible for the uppermost substrate plate to be secured against rotation and/or displacement relative to the substrate plate situated underneath. In this way, it is possible to achieve a high level of dimensional accuracy in the building of the three-dimensional components. The holding device can be set with a release force such that, upon the engagement of the application device on the uppermost substrate plate guided out of the building cylinder, a displacement movement along the working plane relative to the substrate plate situated underneath is made possible.

The rest of the substrate plates that are situated in the building cylinder may, in addition to the releasable holding device, be secured against displacement by build material that is situated in the building cylinder between the substrate plates and the lateral surface of the building cylinder.

The releasable holding device can be formed by a zero-point band system. It is alternatively also possible for multiple projections to be provided on one substrate plate, which engage into corresponding depressions of the oppositely situated substrate plate. In this case, it is, for example, possible for balls, pins, or protruding geometries to engage into corresponding depressions.

In another embodiment, an opening, situated in the working plane of the collecting chamber, is assigned an introduction device. The introduction device has the advantage that, during the transfer of the substrate plate with the at least one completed component by means of the application device, a horizontal displacement movement is possible along the working plane to a point situated fully over the opening of the collecting chamber, such that the substrate plate can subsequently fall downward in a horizontal orientation into the collecting chamber. By means of this introduction device, premature tipping of the substrate plate into the collecting chamber, and possible resulting damage to the components, are prevented.

The introduction device can include guide arms that extend partially along the opening of the collecting chamber, wherein a respective free end of the guide arms is oriented counter to the movement direction, and the substrate plate is movable between the guide arms for the substrate plate to be temporarily received above the collecting chamber. The guide arms have an introduction region before the opening of the collecting chamber, which introduction region is adjoined by bearing surfaces on the guide arms. In this way, a supporting action for the substrate plate during the transfer of the substrate plate into a position above the opening of the collecting chamber can be made possible.

It is furthermore provided that the guide arms of the introduction device have spreading sections on the opposite side in relation to the introduction opening. In this way, it is made possible that, when the substrate plate is positioned above the opening of the collecting chamber, the bearing surfaces of the guide arms are spread outward, such that the substrate plate can fall directly downward into the collecting chamber.

To reduce the falling speed of the substrate plate into the collecting chamber, an impact damping device can be provided. The impact damping device may be insertable into the collecting chamber or may be provided on the lateral surface of the collecting chamber.

The impact damping device may, along the height of the collecting chamber, have multiple damping elements by means of which the falling movement into the collecting chamber is slowed. For example, along rails which extend in a vertical direction, there may be provided in each case multiple damping lugs that are oriented in the direction of the interior space of the collecting chamber. It is possible for multiple such rails with damping lugs to be provided in the collecting chamber in a manner distributed over the circumference for the purposes of damping the falling speed of the substrate plate.

The invention and further advantageous embodiments and refinements thereof will be described and discussed in more detail below on the basis of the examples illustrated in the drawings. The features that emerge from the description and the drawings may be used individually or collectively in any combination in accordance with the invention.

DETAILED DESCRIPTION

Figure 1:
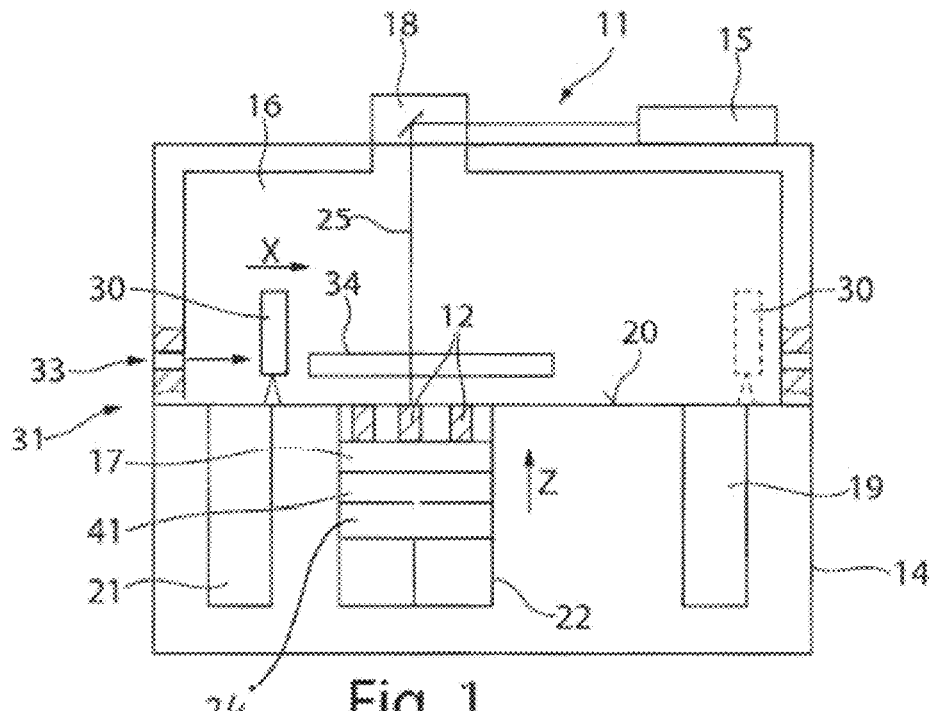
FIG. 1 shows a schematic side view of a device for producing three-dimensional components.

FIG. 1 illustrates a schematic side view of a device 11 for producing components 12 by selective solidification of a build material applied in layered fashion. Similar devices are also referred to as 3D printing systems, selective laser sintering machines, selective laser melting machines, or the like. Device 11 comprises a housing 14, in which a process chamber 16 is provided. Process chamber 16 is closed to the outside and may be accessible, for example, via a door (not illustrated in any more detail) or via a safety closure. In the process chamber 16, a building cylinder 22 is assigned to a working plane 20. In the building cylinder 22, there are provided multiple substrate plates 17, 41 which are stacked one above the other. The substrate plates 17, 41 can be moved in a Z direction relative to the working plane 20.

Provided adjacent to the building cylinder 22 are, for example, one or two collecting chambers 19, in which non-required or non-solidified build material is collected. Alternatively, provision may be made for a storage container 21 for receiving and dispensing build material 23 to be provided on one side of the building cylinder 22. The build material is fed from the storage container 21 to the building cylinder 22 by means of an application device 30. The application device includes a mount (e.g., fastener, bracket) spanning across the width of the building cylinder onto which a blade, wiper, or cylinder is attached. The blade or wiper could be, for example, clamped in, to, or onto, the mount, screwed to the mount, or held by a cavity with a complementary form and positively-locked in place (e.g., if the blade or wiper is Y- or X-shaped). The cylinder is held rotatable around an axis, e.g., attached to a drive for rotating the cylinder to grind parts of a component protruding from the powder bed. The application device 30 further can have a brush strip, a scraper, or the like to transfer non-required or non-solidified build material into the collecting chamber 19. Alternatively, provision may be made for collecting chambers 19 to be provided on both sides of the building cylinder 22, and for the build material 23 to be dispensed directly onto the substrate plate 17 by the application device 30 from above.

The build material can be composed of a metal or a ceramic powder. Other materials suitable for laser melting or laser sintering may also be used.

A beam source 15, for example a laser source, is provided on the housing 14 above the building cylinder 22. The beam source 15 emits a beam 25, which is diverted by means of at least one beam-guiding element 18 onto the working plane 20, e.g., onto the substrate plate 17.

The beam-guiding element 18 may comprise at least one actuatable mirror, e.g., in the form of a scanner. It is additionally also possible for further optical elements to be provided for focusing the beam.

The process chamber 16 is hermetically sealed off. For the production of the three-dimensional component 12, the process chamber is filled with shielding gas or an inert gas to prevent oxidation during the melting of the build material.

A shielding gas system 31 is provided for the feed and discharge of the shielding gas. The shielding gas system has at least one inflow nozzle 33 and one outflow nozzle 34 in the housing 14.

Figure 2:
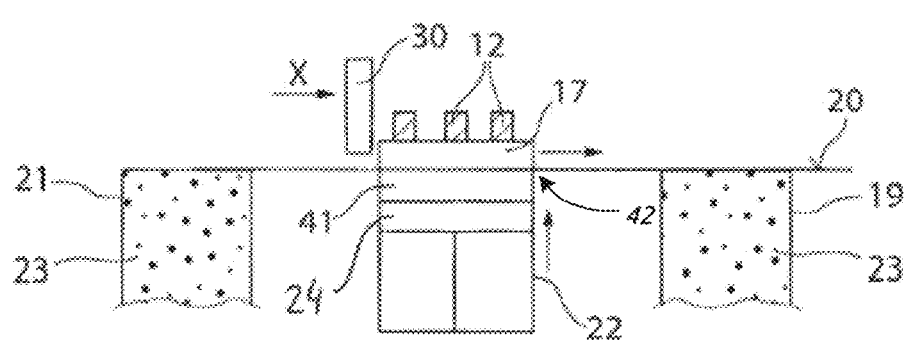
FIG. 2 shows a schematic view of a first step for transporting away a substrate plate with finished components.

After the production of the three-dimensional component 12, the application device 30 is positioned in a position adjacent to the building cylinder 22. The uppermost substrate plate 17 in the building cylinder 22 is subsequently moved in the Z direction such that a bottom side of the uppermost substrate plate 17 lies in the working plane 20. FIG. 2 illustrates such a position of the uppermost substrate plate 17 with respect to the working plane 20 before the commencement of a transporting-away movement. Proceeding from here, a movement of the application device 30 is actuated, the application device being moved in the X direction. A face side of the application device 30 engages on the substrate plate 17. Through the further actuation of the movement of the application device 30 in the X direction, the holding device 42 between the uppermost substrate plate 17 and the substrate plate 41 situated underneath is released. A movement of the substrate plate 17 in the X direction is initiated. The substrate plate 17 is moved by the application device 30 into the collecting chambers 19.

Figure 3:
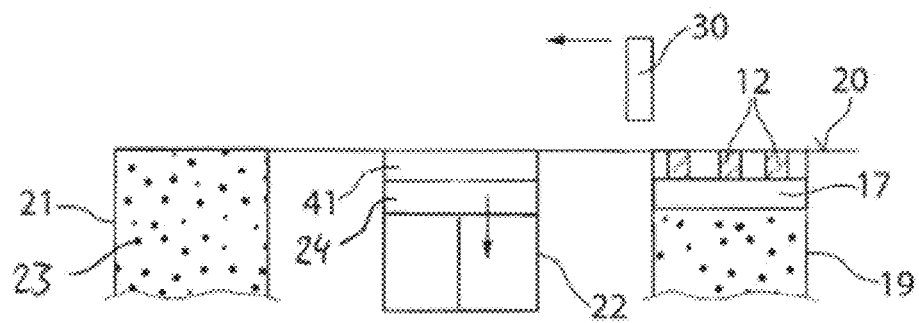
FIG. 3 shows a schematic view of a further working step for transporting away the substrate plate with finished components.

FIG. 3 shows a further working step for the transporting-away of the uppermost substrate plate 17 with, initially, a finished component 12 situated thereon. Here, the application device 30 has been moved such that the substrate plate 17 with the at least one finished component 12 has been transferred into the collecting chambers 19. The application device 30 is subsequently moved in the opposite direction. The substrate plate 41 closest to the working plane 20 is made available for the next process of producing at least one three-dimensional component 12. The application device 30 is subsequently moved in the X direction to apply build material to the substrate plate 41. Subsequently, the application device 30 can push the excess build material that remains on the substrate plate 41 into the collecting chambers 19. Successive production of three-dimensional components 12 on the substrate plates 17, 41 can thus be performed without any downtime of the device 11.

As an alternative to the transfer of the substrate plate 17 with the finished components 12 situated thereon into the collecting chambers 19, provision may be made for the substrate plate 17 to be transferred into a magazine (not illustrated in any more detail). Such a magazine may be configured as a sliding magazine, rotary magazine or a paternoster. Such a magazine is positioned in the movement direction, i.e., in the X direction, of the application device 30. The magazine may, as viewed in the X direction, be provided adjacent to the collecting chamber 19, e.g., to the right of the collecting chamber 19. For the traversing of the collecting chambers 19, traverse elements can be inserted into the collecting chambers 19 such that the substrate plate 17, 41 can be transferred into the adjacent magazine. Such traverse elements may be configured as round bars.

Figure 4:
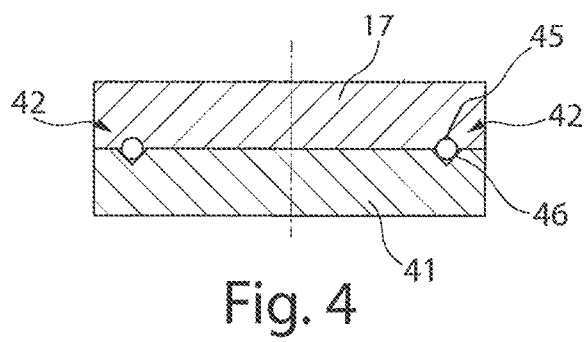
FIG. 4 shows a schematic sectional view of two substrate plates stacked one above the other with a releasable holding device.

FIG. 4 illustrates a schematic sectional view of two substrate plates 17, 41 situated one above the other. These are connected to one another by means of a releasable holding device 42. The releasable holding device 42 serves for securing the two substrate plates 17, 41 against rotation and/or a displacement movement with low forces. The lowermost of the stacked substrate plates 17, 41 in the building cylinder is, analogously to a releasable holding device 42, fixed to a building platform on which a lifting cylinder for the upward and downward movement of the building platform in the building cylinder 22 is actuated.

According to a first embodiment, the releasable holding device 42 may be configured as a projection 45, composed, e.g., of balls or pins that protrude relative to a bottom side of the substrate plate 17 and that engage into a corresponding depression 46 on the oppositely situated substrate plate 41. It is also possible for the arrangement to be interchanged. By means of this arrangement, a relative rotation of the substrate plates 17, 41 with respect to one another can be prevented. Furthermore, easy displacement of the substrate plates 17, 41 relative to one another can be prevented. A release force can be set in a manner dependent on the inter-engagement of the elements of the releasable holding device 42. This, too, can be dependent on the respective geometry of the projection 45 and/or of the depression 46.

It is alternatively also possible for spring-loaded ball pins, or spring-mounted balls, to be provided. The releasable holding device 42 can also be configured as a zero-point band system.

Figure 5:
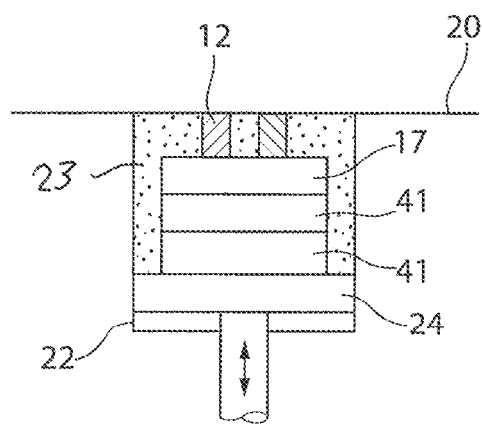
FIG. 5 shows a schematic sectional view of a building cylinder with multiple substrate plates during the production of at least one component.

FIG. 5 shows a schematic sectional view of the building cylinder 22 with multiple substrate plates 17, 41 stacked on a building platform 24. The building platform 24 is movable upward and downward by means of a working cylinder (not illustrated in any more detail) within the building cylinder 22.

The substrate plates 17, 41 are configured to be of smaller diameter than a lateral surface of the building cylinder 22. The build material 23 can pass into an intermediate space between the substrate plates 17, 41 and the lateral surface of the building cylinder 22. In this way, the substrate plates 17, 41 can be additionally secured against displacement relative to one another within the building cylinder 22.

Figure 6:
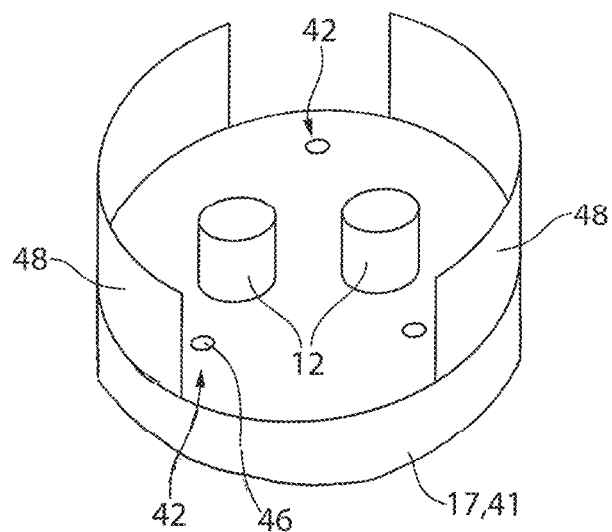
FIG. 6 shows a perspective view of a substrate plate with at least one component and built support elements.

FIG. 6 shows a perspective view of a substrate plate 17, 41 with at least one component 12 built thereon, in the case of which additionally at least one support element 48 is provided. The support element 48 is of equal height to, or, for example, taller than, the tallest component 12 built on the substrate plate 17, 41. It is possible for multiple support elements 48 to be provided. These may be formed in the manner of pillars or, e.g., as illustrated in FIG. 6, as wall elements. The support elements 48 have a protective function. During the transfer of the substrate plate 17, 41 from the building cylinder 22 into the collecting chamber 19, the substrate plates 17, 41 are stacked one above the other. The at least one support element 48 holds the substrate plate 17, 41 situated thereabove spaced apart from the substrate plate 17, 41 which is situated therebeneath and on which the at least one support element 48 is built, such that the components 12 built on the latter substrate plate are not damaged. In some implementations, the support element 48 could be built during the production of the component 12.

The support elements 48 can be of segment-shaped form as outer protective walls.

Figure 7:
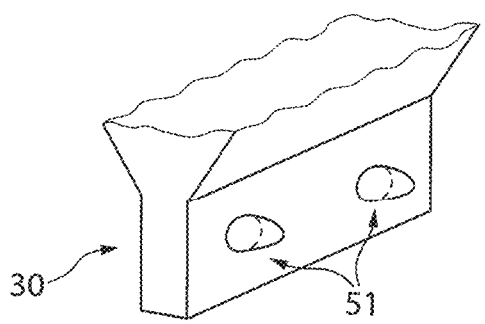
FIG. 7 shows a perspective view of the application device with a guide element.

FIG. 7 illustrates a perspective view of the application device 30. At least one guide element 51 is provided on one face side of the application device 30. The guide element 51 engages on the substrate plate 17, 41 outside a central axis and allows a rectilinear displacement movement along the X axis. In this way, the substrate plate 17, 41 can be transferred in a secured manner into the collecting chambers 19 or the magazine (for example, as per FIG. 2). In the illustrated embodiment, projections are provided as guide elements 51. The projections can be formed from an elastic material, such that they additionally serve as a type of buffer element.

Figure 8:
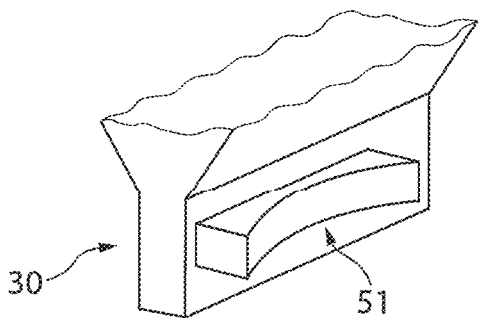
FIG. 8 shows a perspective view of the application device with an alternative guide element in relation to FIG. 7.

FIG. 8 illustrates an alternative embodiment of the at least one guide element 51. Guide element 51 may, for example, have a concave depression to engage on an outer circumference of the substrate plate 17, 41.

Figure 9:
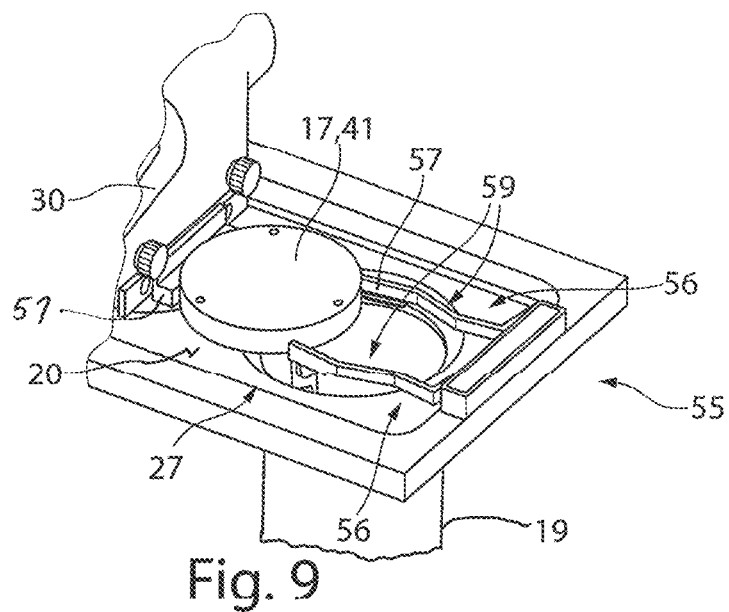
FIG. 9 shows a perspective view of an introduction device for transferring the substrate plate from a working plane into a collecting chamber.

FIG. 9 illustrates a perspective view of an opening 27, which lies in the working plane 20, of the collecting chamber 19. The opening 27 of the collecting chamber 19 is assigned an introduction device 55. The introduction device 55 comprises two guide arms 56, which extend counter to the movement direction by means of which the substrate plate 17, 41 is moved from the building cylinder 22 into the collecting chamber 19. The guide arms 56 have, in the introduction region of the introduction device 55, bearing surfaces 57 which are directed toward one another. In the introduction region of the introduction device 55, the guide arms 56 are spaced apart from one another such that a substrate plate 17, 41 is movable between the guide arms 56, or the guide arms 56 are spread apart by the substrate plate 17, 41. During the transfer of the substrate plate 17, 41 into the introduction device, the bearing surfaces 57 engage under the substrate plate 17, 41 such that the substrate plate can be positioned in a horizontally oriented manner above the opening 27. The guide arms 56 bear with a low load against an outer circumference of the substrate plate 17. Shortly before the substrate plate 17, 41 is positioned entirely over the opening 27 of the collecting chamber 19, spreading sections 59 on the guide arms 56 are actuated by an outer circumference of the substrate plate 17, 41. The guide arms 56 are spread apart. The bearing surfaces 57 of the guide arms 56 release the substrate plate 17, 41. The substrate plate 17, 41 with the at least one component 12 falls into the collecting chamber 19.

Figure 10:
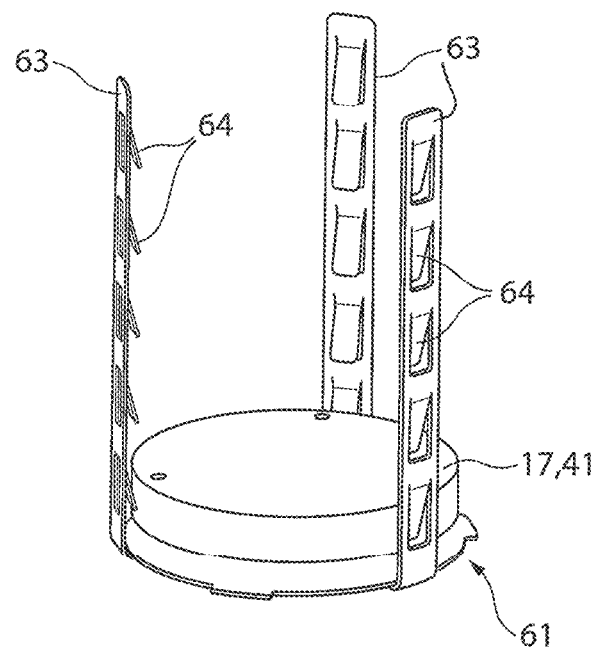
FIG. 10 shows a perspective view of an impact damper for the substrate plates.

FIG. 10 illustrates a perspective view of an embodiment of an impact damping device 61, which is provided for damping the falling movement of the substrate plate 17, 41. Impact damping device 61 can be insertable into the collecting chamber 19. Impact damping device 61 can have a base from which struts or rails 63 extend in a vertical direction. Along rails 63, there are formed multiple damping elements 64, for example in the form of lugs, which protrude into the interior space of the collecting chamber 19. The damping elements 64 and multiple rails 63 can be aligned at the same height as one another. In this way, the substrate plate 17, 41 can fall downward in a horizontal orientation within the collecting chamber 19.

In other embodiments, the impact damping device 61 can alternatively be integrated into or fastened to a peripheral wall of the collecting chamber 19.

OTHER EMBODIMENTS

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A device for producing three-dimensional components by selective solidification from build material applied in layered fashion, the device comprising:
   a process chamber;
   a building cylinder assigned to a working plane in the process chamber and in which two or more substrate plates are movable relative to the working plane, wherein the two or more substrate plates comprise one or more releasable holding devices provided between the substrate plates;
   an application device, arranged to move along the working plane and apply build material to a first substrate plate of the two or more substrate plates in the building cylinder and transfers non-solidified build material into at least one collecting chamber arranged adjacent thereto; and
   a beam source that generates a beam directed by at least one beam-guiding element onto the applied layer,
   wherein the first substrate plate is arranged to move after the completion of at least one component thereon, relative to the building cylinder such that a bottom side of the first substrate plate lies in the working plane, and
   wherein the application device can be controlled to transport the first substrate plate out of the building cylinder and into the collecting chamber or into a magazine.

2. The device of claim 1, wherein the application device has at least one guide element by which the substrate plate is guided along the working plane during the transport movement.

3. The device of claim 2, wherein the at least one guide element is formed by two mutually spaced-apart projections or by a stop with a concave depression.

4. The device of claim 2, wherein the at least one guide element comprises an elastic material.

5. The device of claim 1, wherein the one or more releasable holding devices comprise a zero-point clamping system or multiple projections on one face side of the first substrate plate and corresponding depressions on a second substrate plate of the two or more substrate plates.

6. The device of claim 1, further comprising traverse elements inserted into the collecting chamber.

7. The device of claim 6, wherein the traverse elements are rod-like traverse elements.

8. The device of claim 1, further comprising an introduction device arranged in an opening situated in the working plane of the collecting chamber.

9. The device of claim 8, wherein the introduction device comprises guide arms that extend partially along the opening of the collecting chamber, wherein the guide arms comprise, in the introduction region to the opening of the collecting chamber, bearing surfaces that receive the substrate plate above the opening.

10. The device of claim 9, wherein the guide arms comprise spreading sections arranged to follow the bearing surfaces in the movement direction of the application device, wherein the spreading sections can, as a result of a movement of the substrate plate, be spread apart such that the substrate plate is released from the bearing surfaces and falls into the collecting chamber.

11. The device of claim 1, further comprising an impact damping device inserted into the collecting chamber or provided on a lateral surface of the collecting chamber.

12. The device of claim 11, wherein the impact damping device has, along the height of the collecting chamber, multiple damping elements arranged to brake a falling movement of the substrate plate into the collecting chamber.

13. The device of claim 1, wherein the two or more substrate plates are pre-fixed relative to one another by the one or more releasable holding devices, such that a relative rotation and displacement movement of the two or more substrate plates relative to one another is prevented until a holding force of the one or more releasable holding devices is overcome.

14. The device of claim 13, wherein a force caused by movement of the application member is configured to overcome the holding force of the one or more releasable holding devices and move the first substrate plate relative to other substrate plates of the two or more substrate plates.

* * * * *